Figure 1:
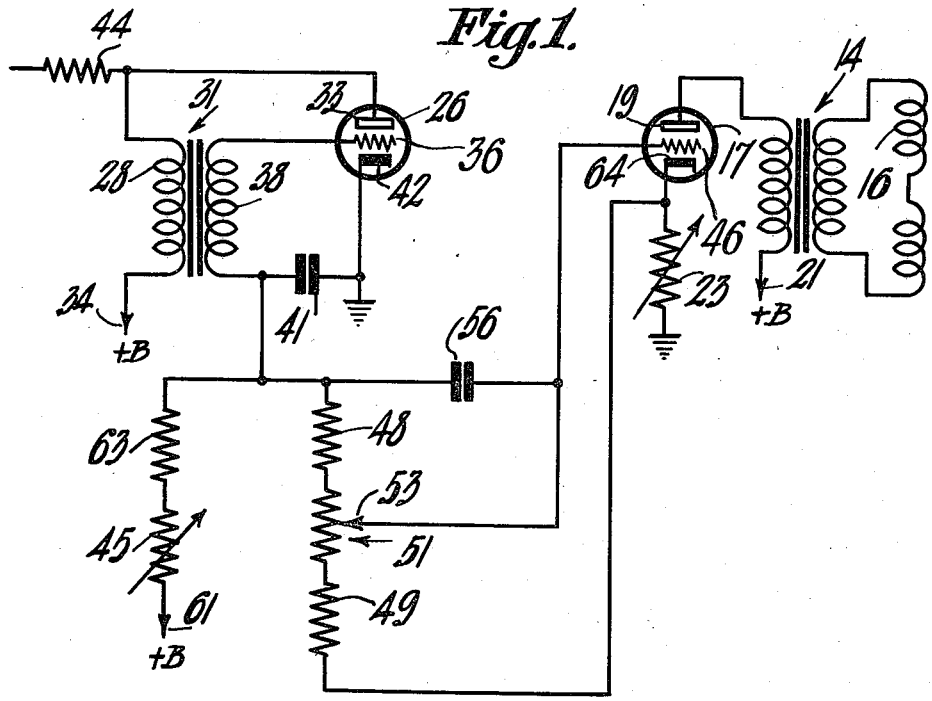

Aug. 7, 1951 M. H. KRONENBERG 2,562,985
BEAM DEFLECTION SYSTEM FOR CATHODE-RAY DEVICES
Filed May 10, 1950

INVENTOR
Marvin H. Kronenberg
BY
ATTORNEY

Patented Aug. 7, 1951

2,562,985

UNITED STATES PATENT OFFICE 2,562,985

BEAM DEFLECTION SYSTEM FOR CATHODE-RAY DEVICES

Marvin H. Kronenberg, Queens Village, N. Y., assignor to Radio Corporation of America, a corporation of Delaware Application May 10, 1950, Serial No. 161,081

6 Claims. (Cl. 315—27)

This invention bears on deflection of a cathode ray beam, namely, but not exclusively, on the aspect of this subject as it concerns dual control by one means.

A circuit was devised and is shown which sweeps a beam. The linearity of sweep is independent of size control setting. A sweep generator is directly coupled to an amplifier. The sweep generator is shown as a blocking oscillator. Bias on the amplifier changes with a change of size control and keeps the output linear. A peaking component in the driving wave at the amplifier grid is provided by a condenser. This circuit cuts down the number of parts such as coupling parts and by-pass parts.

The principal aim is to obtain linearity of sweep in spite of the changes in size of sweep.

Another aim is to provide a novel coupling between a sawtooth voltage wave source and a power amplifier.

Other objects will be seen by reading this specication which refers to the drawing in which:

Figure 1 diagrams a portion of a television receiver having the invention; and

Figure 2:
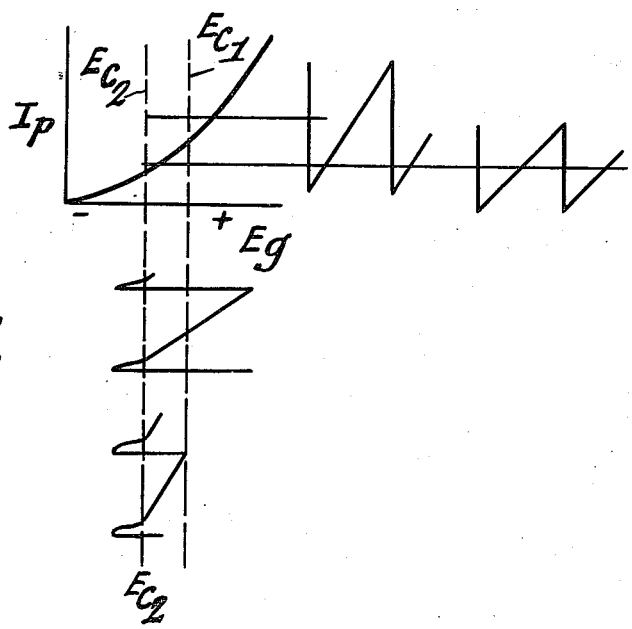

Figure 2 shows curves referred to in the explanation.

Figure 1 of the drawing shows a deflection or sweep circuit for a cathode ray tube (not shown) for sweeping the beam in the vertical direction, for example. Another sweep circuit produces deflection in another direction at right angles to the first direction to produce a raster. Known oscillator circuits similar to that shown herein are disclosed in U. S. Patent No. 2,101,320, granted December 7, 1937, to W. A. Tolson and Tolson Reissue Patent No. Re. 20,338, dated April 30, 1947.

The given example of a sweep circuit comprises a transformer 14 and a deflection coil or coils 16. The coils 16 may be joined in a deflection yoke for use with a cathode ray tube (neither shown). Suitable known centering means (not shown) may be included as desired in the circuit which supplies sweep current to the coils 16.

A tube 17 is connected in the system so that its output circuit serves to drive sweeping current through the coils 16. The tube anode 19 is connected through the primary of the transformer 14 to a suitable source (not shown) of positive voltage at terminal 21. The source connected to the terminal 21 may be the usual "B+" or anode supply generally used with electronic circuits. The cathode circuit of the tube 17 includes an adjustable resistor 23 connected to a reference point, such as ground, in the circuit.

A tube 26 is connected as a blocking oscillator. This action is described in detail in the patents cited above. The primary 28 of a transformer 31 is connected to the tube anode 33 and to the positive voltage source at terminal 34. The grid 36 connects through the secondary 38 and a grid capacitor 41 to the cathode 42. Vertical sync pulses, for example, are supplied through a resistor 44 to the anode 33.

The tube 26 is blocked by a charge on 41 which holds the grid 36 negative. This charge 41 leaks off until the conduction point of the tube 26 is reached. An adjustable resistor 45 serves as a speed control for deflection. When the conduction point is reached the grid voltage is raised immediately and increases due to transformer action. During this part of the cycle grid current is drawn and condenser 41 is charged. Following this, the grid is driven abruptly negative.

The sawtooth of voltage which appears across 41 is fed to the power tube grid 46 through by a D. C. coupling path. This path includes the resistors 48 and 49 and a potentiometer 51 which serve as a voltage divider. The sliding contact 53 connects directly to the grid 46. A relatively high positive potential is connected from the terminal 61 through the adjustable resistor 45 and a second resistor 63 to one end of the condenser 41. A condenser 56 serves to differentiate the sawtooth to provide a peaking component at the grid 46.

In operation, a sawtooth of voltage appears across condenser 41. This sawtooth is fed to the amplifier over the D. C. path above set forth. The amplifier grid 46 is returned to cathode 64. Bias on the amplifier grid is due mainly to the blocking oscillator since the amplifier grid is returned to its cathode. The potentiometer 51 acts as linearity control since it varies the D. C. bias on the amplifier which is derived from the blocking oscillator grid circuit. Condenser 56 differentiates the sawtooth to provide a peaking component at the amplifier grid. The action of the linearity control 53 is mainly to adjust the D. C. bias on the grid 46. It will vary the size but this occurs as a second order effect.

Picture size and linearity together are controlled by the resistor 23 in such a way as to afford a size variation and at the same time effect a bias change of just the right amount and direction to maintain a constantly linear output once 53 has been correctly set at any size.

The action of the size control 23 is two-fold. First, it effectively controls sweep or image size due to the fact that a voltage out-of-phase with that due to the plate circuit is developed at the cathode and it acts in series with the A. C. plate voltage and the output transformer to reduce picture size. This occurs when the resistance of 23 is increasing.

The voltage developed across the resistor 23 along with the D. C. bias source also acts to decrease the total amplifier grid bias, that is make it less negative, for high sawtooth amplitudes. When the gain is maximum, the cathode resistance 23 is minimum and the full negative bias is applied to the amplifier grid. For a small value of sawtooth the cathode potentiometer is maximum and a positive D. C. voltage appears which acts on the bias source to increase the voltage applied to the amplifier grid.

This variation in bias with size is of sufficient magnitude and correct direction to provide compensation and thus allow for a linear output current which is independent of size setting.

The action of resistor 23 with respect to D. C. bias is as follows:

With bias control 23 at zero resistance, bias on the amplifier grid due to the oscillator is —25 volts D. C. As the sweep is made smaller, that is, as the resistor 23 increases, the grid amplifier becomes more negative and at maximum setting of resistor 23, the bias is about —35 volts D. C. This change in bias with size "moves" the sawtooth further down the plate current vs. grid voltage curve so that the curvature of the amplifier tube $i_p$—$e_g$ always compensates for non-linearity in the sawtooth wave. The action is illustrated in Fig. 2 of the drawing. The line $E_{c1}$ is the bias for a large image. $E_{c2}$ is the bias for a small image.

The action of the resistor 23 as a gain control is as follows:

At zero resistance the output is maximum. As the value of the resistor 23 is increased, a voltage approximating a saw-tooth is developed at the cathode of the tube 17. Due to the fact that resistors 48, 49 and 51 are returned to the amplifier cathode, this sawtooth voltage has a degenerative effect on the source voltage. This source voltage is the condenser 41. When the resistor 23 is at maximum resistance, the A.-C. voltage between grid and cathode of the amplifier will be reduced approximately fifteen per cent. At the same time, the resistor 23 acts as if it were a resistance in series with the plate resistance of the amplifier and, thus, also tends to reduce image size due to its action in the plate circuit. The resistor 23, used as a size control, varies the image size to the extent of fifteen percent due to its action on the source voltage and about one hundred percent due to its action in the plate circuit when each action is observed separately. These values are approximate and estimated. A change in wave form is observed between the grid 46 and the cathode as the resistor 23 is varied. This indicates that the degenerative action of the resistor 23 on the voltage source also provides a compensating effect on linearity. This compensation aids in maintaining good and constant linearity regardless of picture size setting.

Solely by way of example, the following data is given. These apply to an operative example. The tube 26 was one-half of a 6SN7. The tube 17 was a 6AR5. The voltage applied to the terminal 34 was 100 voltage positive. The voltage applied to terminal 61 was 400 volts postive. The voltage applied to the terminal 21 was 400 volts positive. The resistor 63 was 10 megohms. Resistor 45 had a total resistance of 5 megohms. Resistors 48 and 49 had a value of 3.9 megohms. Resistor 51 was 5 megohms. Capacitor 56 had a value of 50 mmf. Condenser 41 had a value of .004 mf. Resistor 23 had a total value of 500 ohms. Resistor 44 had a value of 100,000 ohms.

What is claimed is:

1. A deflection system for a cathode ray beam providing linearity and size control comprising, a first electron tube having connections including a grid condenser whereby to function as a blocking oscillator, a second electron tube having a grid, an anode, and a cathode, a conductive connection including a voltage divider from said grid condenser for said first tube to the grid of said second tube, said voltage divider having a plurality of resistors in series, an adjustable tap connection from one of said resistors to the grid of said second tube, and a second condenser connected between said grid condenser for said first tube and the grid of said second tube.

2. A deflection system for a cathode ray beam comprising a first electron tube having connections including a grid condenser whereby to function as a blocking oscillator, a second electron tube having a grid, an anode, and a cathode, an output circuit connected to the anode of said second tube, deflection driving means in said output circuit, a cathode circuit for said second tube, an adjustable resistor in the cathode circuit of said second tube whereby to serve as a size control for said deflection system, a conductive connection from said grid condenser for said first tube to the grid of said second tube including a potentiometer to serve as a linearity control, and a second condenser connected between said grid condenser for said first tube and the grid of said second tube, said second condenser serving to provide a peaking component to said second tube.

3. A deflection system for a cathode ray beam comprising, a first electron tube, said first tube having a cathode, an anode, and a grid, a coupled grid coil and plate coil, said first tube grid being connected to said grid coil, a grid condenser connected between the other end of said grid coil and said first tube cathode, said first tube anode being connected to said plate coil, a second electron tube having a grid, an anode, and a cathode, a conductive connection from said grid condenser for said first tube to the grid of said second tube, and a second condenser connected between said grid condenser for said first tube and the grid of said second tube, said second condenser serving to provide a peaking component to said second tube.

4. A deflection system for a cathode ray beam comprising, a first electron tube, said first tube having a cathode, an anode, and a grid, a coupled grid coil and plate coil, said first tube grid being connected to said grid coil, a grid condenser connected between the other end of said grid coil and said first tube cathode, said first tube anode being connected to said plate coil, a second electron tube having a grid, an anode, and a cathode, an output circuit connected to the anode of said second tube, reflection driving means in said output circuit, a cathode circuit for said second tube, an adjustable resistor in the cathode circuit of said second tube whereby to serve as a size control for said deflection system, a conductive connection from said grid condenser for said first tube to the grid of said second tube including a potentiometer to serve as a linearity control, and a second condenser connected between said grid condenser for said first tube and the grid of said second tube, said second condenser serving to provide a peaking component to said second tube.

5. A deflection system for a cathode ray beam comprising, a first electron tube, said first tube having a cathode, an anode, and a grid, a coupled grid coil and plate coil, said first tube grid being connected to said grid coil, a grid condenser connected between the other end of said grid coil and said first tube cathode, said first tube anode being connected to said plate coil, a second electron tube having a grid, an anode, and a cathode, an output circuit connected to the anode of said second tube, deflection driving means in said output circuit, a cathode circuit for said second tube, an adjustable resistor in the cathode circuit of said second tube whereby to serve as a size control for said deflection system, a conductive connection from said grid condenser for said first tube to the grid of said second tube, and a second condenser connected between said grid condenser for said first tube and the grid of said second tube, said second condenser serving to provide a peaking component to said second tube.

6. A deflection system for a cathode ray beam comprising, a first electron tube, said first tube having a cathode, an anode, and a grid, a coupled grid coil and plate coil, said first tube grid being connected to said grid coil, a grid condenser connected between the other end of said grid coil and said first tube cathode, said first tube anode being connected to said plate coil, a second electron tube having a grid, an anode, and a cathode, a conductive connection from said grid condenser for said first tube to the grid of said second tube including a potentiometer to serve as a linearity control, and a second condenser connected between said grid condenser for said first tube and the grid of said second tube, said second condenser serving to provide a peaking component to said second tube.

MARVIN H. KRONENBERG.

REFERENCES CITED

The following references are of record in the file of this patent:

UNITED STATES PATENTS

| Number | Name | Date |
| --- | --- | --- |
| 2,082,317 | Barber | June 1, 1937 |
| 2,212,217 | White et al. | Aug. 20, 1940 |
| 2,253,355 | Taylor | Aug. 19, 1941 |
| 2,455,321 | Stolze et al. | Nov. 30, 1948 |
| 2,466,712 | Kenyon | Apr. 12, 1949 |